(12) United States Patent
Cho et al.

(10) Patent No.: US 11,734,831 B2
(45) Date of Patent: Aug. 22, 2023

(54) METHOD FOR SUPPORTING X-RAY IMAGE READING USING IMAGE TRANSFORM MODEL AND SYSTEM PERFORMING THE SAME

(71) Applicant: KOREA INSTITUTE OF SCIENCE AND TECHNOLOGY, Seoul (KR)

(72) Inventors: Junghyun Cho, Seoul (KR); Ig Jae Kim, Seoul (KR); Hyunwoo Cho, Seoul (KR); Haesol Park, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 379 days.

(21) Appl. No.: 17/102,537

(22) Filed: Nov. 24, 2020

(65) Prior Publication Data

US 2021/0241463 A1 Aug. 5, 2021

(30) Foreign Application Priority Data

Feb. 3, 2020 (KR) ........................ 10-2020-0012559

(51) Int. Cl.
*G06T 7/00* (2017.01)
*G06T 7/168* (2017.01)
*G06T 7/32* (2017.01)

(52) U.S. Cl.
CPC ............... *G06T 7/168* (2017.01); *G06T 7/32* (2017.01); *G06T 2207/10116* (2013.01);
(Continued)

(58) Field of Classification Search
CPC . G06T 7/168; G06T 7/32; G06T 2207/10116; G06T 2207/20021; G06T 2207/20081; G06T 2207/20084; G06T 2207/30136; G06T 7/001; G06T 7/10; G01N 23/043; G06N 20/00
(Continued)

(56) References Cited

U.S. PATENT DOCUMENTS 9,996,772 B2 6/2018 Ahmed et al.
10,302,807 B2 * 5/2019 Yu .............................. G06T 7/60
(Continued)

FOREIGN PATENT DOCUMENTS

EP 3171332 B1 1/2019
KR 10-2011-0054125 A 5/2011
(Continued)

OTHER PUBLICATIONS

Ian J. Goodfellow et al., "Generative Adversarial Nets," Proceedings of the 27th International Conference on Neural Information Processing Systems, Dec. 2014, pp. 2672-2680, vol. 2.

*Primary Examiner* — Van D Huynh
(74) *Attorney, Agent, or Firm* — Cantor Colburn LLP

(57) ABSTRACT

Embodiments relate to a method for supporting X-ray image reading including receiving information associated with a reading target positioned in a reading space where X-rays pass through or are reflected off, acquiring a non X-RAY image of an item object based on the information associated with the reading target, and generating a fake X-RAY image of the item object by applying the non X-RAY image of the item object to the image transform model, and a system for performing the same.

20 Claims, 5 Drawing Sheets

(52) U.S. Cl.
CPC .............. *G06T 2207/20021* (2013.01); *G06T 2207/20081* (2013.01); *G06T 2207/20084* (2013.01)

(58) Field of Classification Search
USPC ........................................................ 382/173
See application file for complete search history.

(56) References Cited

U.S. PATENT DOCUMENTS

| | | |
|---|---|---|
| 10,453,223 B2 | 10/2019 | Cinnamon et al. |
| 2013/0117258 A1* | 5/2013 | Linsley ................. G06F 16/532 707/E17.019 |
| 2016/0098426 A1* | 4/2016 | Sayko ................... G06F 16/951 707/770 |
| 2017/0140526 A1* | 5/2017 | Chen .................... G06Q 30/018 |
| 2019/0099151 A1* | 4/2019 | Rajasekaran .......... G16H 50/30 |
| 2020/0073008 A1* | 3/2020 | Parikh ................. G06Q 10/0838 |

FOREIGN PATENT DOCUMENTS

| | | | |
|---|---|---|---|
| KR | 101778503 B1 | 9/2017 | |
| KR | 101890538 B1 | 8/2018 | |
| KR | 101917000 B1 | 11/2018 | |
| KR | 101959831 B1 | 3/2019 | |
| KR | 102015391 B1 | 8/2019 | |
| WO | WO-2019132590 A1 * | 7/2019 | ........... G06T 11/005 |

\* cited by examiner

METHOD FOR SUPPORTING X-RAY IMAGE READING USING IMAGE TRANSFORM MODEL AND SYSTEM PERFORMING THE SAME

DESCRIPTION OF GOVERNMENT-FUNDED RESEARCH AND DEVELOPMENT

This study (Project No. CAP-18-03-ETRI, Project Name: Technology development for catching fake reports to contrabands based on virtual image) was supported by National Research Council of Science & Technology under the superintendence of Ministry of Science and ICT.

CROSS-REFERENCE TO RELATED APPLICATION

This application claims priority to Korean Patent Application No. 10-2020-0012559, filed on Feb. 3, 2020, and all the benefits accruing therefrom under 35 U.S.C. § 119, the contents of which in its entirety are herein incorporated by reference.

TECHNICAL FIELD

Embodiments of the present disclosure relate to technology that supports the reading of an original X-RAY image of a reading target, in which a non X-RAY image of the reading target is acquired based on information associated with an object placed in a reading space, and the fake X-RAY image of the reading target is generated using an image transform model configured to transform an input image into an X-RAY image.

BACKGROUND ART

With the development of transportation industry and IT industry in the modern society, domestic/international cargo transportation is riding high. Cargo for international transportation includes personal items loaded onto the means of transport (for example, aircraft or ships) persons board while traveling, and exports loaded at a large scale by transactions between companies.

In international transportation, when cargo departs from the country of departure of the means of transport, and/or when cargo arrives at the destination country of the means of transport, the customs authority of the corresponding country inspects the cargo to determine if the cargo conforms to the international cargo related regulations such as tax regulations, transportation regulations or security regulations. For example, the customs authority of the country of departure may inspect the cargo to determine if cargo not allowed on aircraft (for example, dangerous goods) is included in personal items for the purpose of aircraft security. Alternatively, the customs authority of the destination country may inspect the cargo for smuggled goods not in accordance with the tax regulations.

The cargo inspection is performed by a process in which after opening a space (for example, a container or a cargo storage) in which cargo is loaded, a customs officer inspects the cargo; or an inspection process based on an X-RAY image acquired through X-RAY inspection machine. First, the inspection process after opening the container requires a long time and a high inspection cost. Accordingly, cargo inspection in international transportation is performed by the X-RAY based inspection process that can inspect a lot of freight per unit time.

FIG. 1 is a conceptual view of the X-RAY based inspection process according to an embodiment of the related art, and FIG. 2 is a diagram showing an image used in the inspection of FIG. 1.

Referring to FIG. 1, in the case of customs inspection of imports from foreign countries, a reading space includes a space (for example, a container) in which cargo is placed on the means of transport (for example, a container truck). When the reading space is irradiated with X-rays and an amount of X-rays that pass through or are reflected off an object is detected, imaging information is acquired, and eventually, an X-RAY image of the reading space is acquired as shown in FIG. 2. According to the related art, a customs officer determines if the object in the X-RAY image acquired by capturing the reading space corresponds to an item included in a cargo list by comparing information associated with the cargo included in the reading space with the X-RAY image of the reading space. That is, the inspection is performed by comparing text information associated with the reading target in the original X-RAY image with the original X-RAY image.

However, the limitation of the X-RAY based inspection process is that the inspection results rely on the reader's skills or fatigue.

RELATED LITERATURES

Patent Literatures (Patent Literature 1) Patent No. 10-1917000 (2018.11.02.)

Non-Patent Literatures (Non-Patent Literature 1) Goodfellow, Ian J.; Pouget-Abadie, Jean; Mirza, Mehdi; Xu, Bing; Warde-Farley, David; Ozair, Sherjil; Courville, Aaron; Bengio, Yoshua (2014). "Generative Adversarial Networks"

DISCLOSURE

Technical Problem

The embodiments of the present disclosure provide a method for supporting X-RAY image reading including acquiring a non X-RAY image of an item object in information based on information associated with a reading target positioned in a reading space to support the reading of an original X-RAY image of the reading target, and generating a fake X-RAY image of the item object that is difficult to distinguish from a real X-RAY image of the item object using an image transform model configured to transform an input image into an X-RAY image, and a system for performing the same.

Technical Solution

A method for supporting X-ray image reading using an image transform model according to an aspect of the present disclosure is performed by a computing device including a processor, and the method includes receiving information associated with a reading target positioned in a reading space where X-rays pass through or are reflected off, acquiring a non X-RAY image of an item object based on information associated with the item object, and generating a fake X-RAY image of the item object by applying the non X-RAY image of the item object to the image transform model.

In an embodiment, acquiring the non X-RAY image of the item object may include extracting a name of the item object from the information associated with the item object, generating a search query based on the name of the item object, transmitting the search query to a web server, and receiving an image found in response to the search query received by the web server as the non X-RAY image of the item object.

In an embodiment, the web server may be a server that is accessible via World Wide Web and configured to perform a web search.

In an embodiment, the method may further include, before applying the non X-RAY image of the item object to the image transform model, calculating segment information by dividing the non X-RAY image of the item object into at least one segment. Here, the segment includes an object or part of the object, and the segment information includes at least one of boundary information or location information of the segment in the image.

In an embodiment, calculating the segment information may include applying the non X-RAY image of the item object to a segmentation model. Here, the segmentation model is configured to label a pixel of an input image with a pre-learned class.

In an embodiment, generating the fake X-RAY image of the item object may include further applying the segment information of the non X-RAY image of the item object to the image transform model.

In an embodiment, the image transform model includes a generator to transform an input image into an X-RAY image, and when receiving an input of data, the generator is learned to minimize a data distribution and a reconstruction error of training samples used in learning or generate output data belonging to the data distribution.

In an embodiment, the image transform model may be a model that is learned through a training data set including a plurality of training samples, and each training sample may include each of a non X-RAY image and a segmented image, and an X-RAY image and a segmented image of a training object.

In an embodiment, each training sample may further include segment information acquired by dividing the non X-RAY image of the training object. Here, the segment information includes at least one of location information or boundary information of the segment included in the non X-RAY image of the training object.

In an embodiment, the non X-RAY image is an image acquired through visible light.

In an embodiment, the method may further include detecting the reading target in the original X-RAY image by comparing an original X-RAY image of the reading target with the fake X-RAY image of the reading target generated by the image transform model.

In an embodiment, the comparing may include extracting a first feature set from the original X-RAY image, extracting a second feature set from the fake X-RAY image, calculating similarity between the first feature set and the second feature set, and determining if the original X-RAY image of the reading target matches the fake X-RAY image of the item object based on the calculated similarity score.

In an embodiment the original X-RAY image may be generated based on imaging information detected by irradiation of X-rays onto the reading space In an embodiment, the method may further include generating feedback learning data by synthesizing the fake X-RAY image of the reading target with an X-RAY image of a background to re-learn the learned image transform model.

A computer-readable recording medium according to another aspect of the present disclosure is readable by a computing device and may store program instructions that can be executed by the computing device. Here, when executed by a processor of the computing device, the program instructions enable the processor to perform the method for supporting X-ray image reading according to the above-described embodiments.

A system according to still another aspect of the present disclosure may include an X-RAY imaging device to emit X-rays to a reading space, in which at least one object is positioned, to generate an original X-RAY image of the reading space, and a data processing device configured to receive imaging information acquired by the X-rays passing through or reflected off the reading space and generate the original X-RAY image of the reading space, receive information associated with the reading target positioned in the reading space, acquire a non X-RAY image of the reading target based on the information associated with the reading target, and generate a fake X-RAY image of the reading target by applying the non X-RAY image of the reading target to an image transform model.

In an embodiment, the data processing device is accessible to a web server via a network, and the system may be further configured to generate a search query based on the information associated with the reading target, transmit the search query to the web server, and receive an image found in response to the search query received by the web server as the non X-RAY image of the reading target.

In an embodiment, the image transform model includes a generator to transform an input image into an X-RAY image, and when receiving an input of data, the generator is learned to minimize a data distribution and a reconstruction error of training samples used in learning or generate output data belonging to the data distribution.

In an embodiment, the data processing device may be further configured to, before applying the non X-RAY image of the reading target to the image transform model, calculate segment information by dividing the non X-RAY image of the reading target into at least one segment, the segment may include an object or part of the object, and the segment information may include at least one of boundary information or location information of the segment in the image.

In an embodiment, the data processing device may be further configured to detect the reading target in the original X-RAY image by comparing the original X-RAY image of the reading space with the fake X-RAY image of the reading target generated by the image transform model.

Advantageous Effects

The system according to an aspect of the present disclosure generates a reference image using an image acquired through web search, and thus can be used in a variety of cargo lists. Accordingly, compared with systems using internal databases having limitations on stored images, it can be used in an infinite range of cargo lists, and has a high utilization possibility.

In addition, an X-RAY image of a reading target generated through the image transform model is generated as a fake image that is so identical or similar to a real X-RAY image acquired by directly capturing the reading target with X-rays that it is hard to distinguish them. The fake X-RAY image is an image for reading generated based on text information such as a cargo list, and may be compared with an actually captured original X-RAY image.

As such, the task of reading the reading target by the system is performed by image comparison, and finally it is possible to support a user's task of reading the original X-RAY image acquired by actually capturing the reading target.

As a result, it is possible to provide the user (for example, a customs officer) with higher reading convenience than the traditional reading task involving comparing the text (for example, the cargo list) with the image (the original X-RAY image).

Further, the image transform model that generates a fake X-RAY image from a non X-RAY image is built by learning Generative Adversarial Network (GAN) based image generation from segment information of SegNet based image. Through this configuration, there is no constraint requirements that the non X-RAY image and the real X-RAY image should be paired together to form a pair having correspondence on the pixel level and used for learning of the image transform model, thereby providing high suitability for use in customs applications.

The effects of the present disclosure are not limited to the above-mentioned effects, and other effects not mentioned herein will be clearly understood by those skilled in the art from the appended claims.

DESCRIPTION OF DRAWINGS

The following is a brief introduction to necessary drawings in the description of the embodiments to describe the technical solutions of the embodiments of the present disclosure or the existing technology more clearly. It should be understood that the accompanying drawings are for the purpose of describing the embodiments of the present disclosure and not intended to be limiting of the present disclosure. Additionally, for clarity of description, the accompanying drawings may show some modified elements such as exaggerated and omitted elements.

BEST MODE

The terminology used herein is for the purpose of describing particular embodiments and not intended to be limiting of the present disclosure. Unless the context clearly indicates otherwise, the singular forms as used herein include the plural forms as well. The term "comprises" or "includes" when used in this specification, specifies the presence of stated features, regions, integers, steps, operations, elements and/or components, but does not preclude the presence or addition of one or more other features, regions, integers, steps, operations, elements and/or components.

Unless otherwise defined, all terms (including technical and scientific terms) used herein have the same meaning as commonly understood by those skilled in the art. It is further understood that terms, such as those defined in commonly used dictionaries, should be interpreted as having a meaning that is consistent with their meaning in the context of the relevant art document and the present disclosure, and will not be interpreted in an idealized or overly formal sense unless expressly so defined herein.

Hereinafter, the embodiments of the present disclosure will be described in detail with reference to the accompanying drawings.

Figure 3:
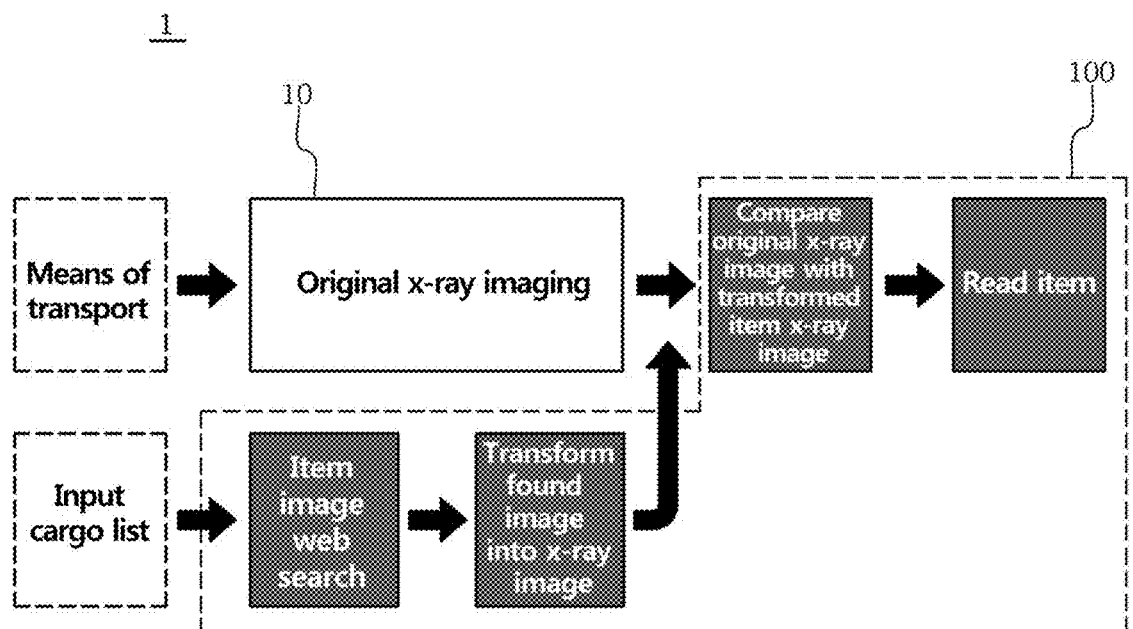
FIG. 3 is a conceptual view of an X-RAY reading system according to an embodiment of the present disclosure.

FIG. 3 is a conceptual view of an X-RAY reading system according to an embodiment of the present disclosure.

Referring to FIG. 3, the X-RAY reading system 1 may include a data processing device to receive at least one of imaging information of a reading space imaged using X-rays or information associated with an object, and detect the object in an X-RAY image. Additionally, in some embodiments, the X-RAY reading system 1 may further include an X-RAY imaging device 10 to capture the object present in the imaging range through x-rays.

The X-RAY reading system 1 according to embodiments may have aspects of entirely hardware, entirely software, or partly hardware and partly software. For example, the system may refer collectively to hardware capable of processing data and software that manages the hardware. The term "unit", "module", "device" or "system" as used herein is intended to refer to a combination of hardware and software that runs by the corresponding hardware. For example, the hardware may be a data processing device, including a Central Processing Unit (CPU), a Graphic Processing Unit (GPU) or other processor. Additionally, the software may refer to a process being executed, an object, executable, a thread of execution and a program. The X-RAY imaging device 10 is configured to emit x-rays to the reading space including the object, receive x-rays that pass through or are reflected off the reading space and output the imaging information. The X-RAY image shown in FIG. 2 is acquired by the X-RAY imaging device 10.

The X-RAY imaging device 10 may include a variety of devices that generate X-RAY images using x-rays.

Figure 1:
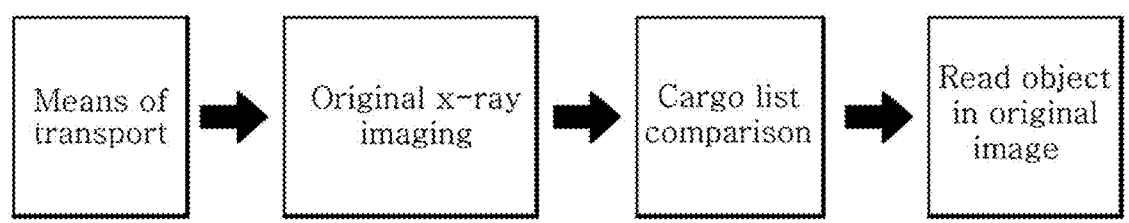
FIG. 1 is a conceptual view of an X-RAY based inspection process according to an embodiment of the related art.
Figure 2:
FIG. 2 is a diagram showing an image used in the inspection of FIG. 1.

In an example, the X-RAY imaging device 10 is a sort of scanner, and when transmitting the imaging information to an external computing device such as a computer, the X-RAY imaging device 10 may generate the X-RAY image shown in FIG. 2 by image processing of the imaging information received by the computing device. In this case, the imaging information may be basic information used to generate the penetrating or reflected image of FIG. 2, including the scan results.

In another example, the X-RAY imaging device 10 includes a processor, and may be further configured to generate an output image through image processing. Then, the X-RAY imaging device 10 may generate the X-RAY image on its own. In this case, the imaging information transmitted to the data processing device 100 may be an X-RAY image.

The X-RAY image shown in FIG. 2 is generally represented as a black/white image or a color image through the X-RAY imaging device 10, and is displayed in brightness or color according to the element symbols that make up the object being imaged.

The X-RAY image may include at least one object and a background. The at least one object may include a reading target that a user wants to read.

The data processing device 100 is a computing device including a processor, and may include, for example, a laptop computer, a notebook computer and a smartphone. The data processing device 100 is configured to transmit/receive data to/from an external device via wired/wireless electrical communication. In some embodiments, the data processing device 100 may be electrically connected to the X-RAY imaging device 10 to directly receive the imaging information of the X-RAY imaging device 10. Alternatively, the data processing device 100 may indirectly receive the imaging information of the X-RAY imaging device 10. In this case, the data processing device 100 may receive an X-RAY image of the X-RAY imaging device 10 generated by a different computing device.

The data processing device 100 receives information associated with the reading target positioned in the reading space where X-rays will pass through or be reflected off.

In an embodiment, the information associated with the reading target may be list information of at least some objects positioned in the reading space.

The reading space varies depending on locations at which the X-RAY reading system 1 is installed. For example, when the X-RAY reading system 1 is applied to a harbor, the reading space may include a space where a container is disposed at or passes through. Alternatively, when the X-RAY reading system 1 is applied to an airport checkpoint, the reading space may include a space where baggage is disposed at or passes through. The reading space may further include an object (for example, a cargo support component) other than the cargo.

The reading target is an object that the user wants to read, and includes, for example, shipment loaded on the container or baggage to be loaded onto aircraft. Additionally, the reading target is not limited to products, and may include living things such as illegal humans or animals for prevention of infectious diseases.

When the object positioned in the reading space is cargo, the list information of the object may be a cargo list (or a freight list). The list of the list information includes an object (hereinafter, an "item object") corresponding to at least one item. However, the information associated with the reading target is not limited thereto, and may include various information having information associated with at least one of objects positioned in the reading space. Hereinafter, for clarity of description, the present disclosure will be described in more detail with the information associated with the reading target being referred to as the cargo list.

When the user is a customs officer, the item loaded onto the container is the reading target, and the cargo list submitted to the customs officer to report that the item has been loaded onto the container is acquired as the information associated with the reading target.

In the above-described embodiment, the list information includes ID information of the item object. The ID information of the item object may include, for example, the name of the object (or a product name), a code (for example, a product code) provided by the object's manufacturer or a code (for example, a tariff code) provided by a government agency. However, the information associated with the reading target is not limited thereto, and may include various information having information associated with at least one of objects positioned in the reading space.

When the cargo list is inputted to the data processing device 100, the data processing device 100 is configured to acquire a non X-RAY image of the item object (for example, cargo in the list) included in the received cargo list.

The non X-RAY image is an image acquired by image search from the cargo list information, and in an embodiment, the non X-RAY image may be a color image acquired using visible light. However, the non X-RAY image is not limited thereto, and may be an image acquired using wavelengths that are different from x-rays, such as infrared light.

In an embodiment, the data processing device 100 generates a search query for at least one of cargos included in the received cargo list. Then, the data processing device 100 transmits the search query to a web server.

The web server is connected to the data processing device 100 via a network communication network. The network communication network may be built irrespective of the communication type such as wired and/or wireless. In an embodiment, the network communication network may be the World Wide Web (WWW).

The web server connected via the World Wide Web is a server having web pages, configured to search for images, and may be, for example, an operating server of a portal site. The web server performs a search in response to the search query of the data processing device 100 through a search engine that searches the web pages.

The data processing device 100 generates the search query corresponding to the web server to transmit. In an embodiment, when the web server is connected via WWW, the data processing device 100 generates the search query based on the name of the object in the cargo list, and transmits the search query to the web server via WWW.

To this end, the data processing device 100 may be configured to display a user interface (UI) including a field for inputting a text representing the name of the object or a code associated with the name. The data processing device 100 determines the name of the object based on data inputted to the corresponding field, and generates the search query including the determined name of the object.

For example, the data processing device 100 may extract the name of the cargo or the type name of the cargo included in the received cargo list as the name of the reading target, and generate the search query based on the extracted name of the item object.

Then, the web server may perform a web search operation including searching for the non X-RAY image of the cargo in the list among non X-RAY images stored in the database of the web server based on the search query received from the data processing device 100, and transmitting the found non X-RAY image of the cargo in the list to the data processing device 100 in response to the search query. The web search operation for searching for the non X-RAY image via the World Wide Web may be performed by, for example, a search process of acquiring an image by inputting a keyword to the search engine, such as searching for an image that is identical or similar to the corresponding object by inputting the name text or the type text of the object included in the cargo list to the search portal.

Additionally, after acquiring the text such as the name of the object in the cargo list, the data processing device 100 may be further configured to modify the representation of the name of the object to increase the search efficiency. In an embodiment, the data processing device 100 may add an additional search condition to the representation of the name of the object. The additional search condition includes the attributes of the non X-RAY image. The image attributes include a variety of image attributes including, for example, a viewer condition such as 'side image' and/or a resolution condition such as 'degree of definition'.

In another embodiment, the network communication network may be a local network. In this case, the web server is configured to pre-create at least one non X-RAY image associated with each of the plurality of objects. Additionally, the data processing device 100 generates the search query for the local network according to a preset protocol, and transmits the search query to the web server via the local network.

The data processing device 100 transforms the acquired non X-RAY image of the cargo in the list into a fake X-RAY image that is difficult to distinguish from the real X-RAY image of the cargo in the list. Here, the real X-RAY image refers to an image that will be acquired when the X-RAY imaging device 10 directly captures the target. An original X-RAY image as described below corresponds to the real X-RAY image. The fake X-RAY image refers to an image not acquired directly from the reading target. When the real reading target positioned on the reading space is recorded in the list, the fake X-RAY image that is identical or almost similar to the real X-RAY image of the reading target is acquired.

The data processing device 100 includes an image transform model that is pre-learned to transform an image of input data into a fake X-RAY image.

In an embodiment, the data processing device 100 is configured to calculate segment information by dividing the non X-RAY image of the reading target into at least one segment; and apply the segment information and the non X-RAY image of the reading target to the image transform model.

Most of images that are searched through the search engine do not include only an object. Such images include a combination of the corresponding object and the background, or a combination of the corresponding object, another object and the background.

The data processing device 100 is configured to divide the object included in the image into segments by extracting features from the image. To this end, the data processing device 100 may include a segmentation model.

The segmentation model is configured to label each pixel included in the image with a corresponding class. The class includes an object such as, for example, a car or parts of the object such as the wheel and the body of the car. The segmentation model is set in which the number of labelable classes rely on the learning data set of the segmentation model.

In an embodiment, the segmentation model is learned through a plurality of learning samples. Each learning sample includes a non X-RAY image of a candidate cargo object and segment information in the non X-RAY image.

The segmentation model may have a variety of network architectures including convolution filters. The segmentation model may be built based on, for example, FCN, SegNet, DeepLab structure.

The data processing device 100 may calculate segment information by dividing into at least one segment by labeling each pixel included in the non X-RAY image of the object with a corresponding class by the segmentation model. The segment information includes boundary information and/or location information of the segment in the found image (i.e., the non X-RAY image).

It is possible to achieve more efficient image transformation of the area of the cargo included in the found image by the location and/or the boundary of the cargo acquired by segmentation.

Additionally, the data processing device 100 may remove the background from the image found through segmentation.

In the image from which the background is removed, for example, the previous background area may be processed into black, but is not limited thereto, and may be processed into a different color (for example, white). The reading target in the image from which the background is removed includes at least one segment. For example, when the reading target is a car, the wheel may be partitioned as a first segment, the body as a second segment and the window as a third segment, and the object in the image may include three segments. In some embodiments, the data processing device 100 may be further configured to provide the UI to induce the user to identify the image from which the background is removed. In this case, the data processing device 100 may be further configured to set the background area in the image according to the user's input, and remove the set area.

Additionally, the data processing device 100 may additionally generate a labeled image in which each pixel in the non X-RAY image of the object is assigned an associated label.

Additionally, the data processing device 100 may generate segment feature information of the resulting segment after segmentation. In this case, the segment information further includes the segment feature information.

In an embodiment, the feature information of the segment is generated based on the cargo list. The feature information of the segment includes product features of the cargo that are difficult to extract from the non X-RAY image by segmentation, but may affect the reading of the X-RAY image (for example, causing an error).

For example, in the case of a product such as a car, the car is divided into the body, the light, the tire, the wheel and the window, and these are the feature information of the segment.

The data processing device 100 generates a fake X-RAY image of the cargo in the list by applying the non X-RAY image of the cargo in the list and the segment information to the image transform model. The non X-RAY image of the reading target may be the found image or a different image based on the found image. In some embodiments, the non X-RAY image of the cargo in the list applied to the image transform model may be the labelled image.

The image transform model is a machine learning model that generates an image based on input data, and has an image generation structure including, for example, Auto-Encoder (AE), Variational Auto-Encoder (VAE) and Generative Adversarial Network (GAN).

Figure 4:
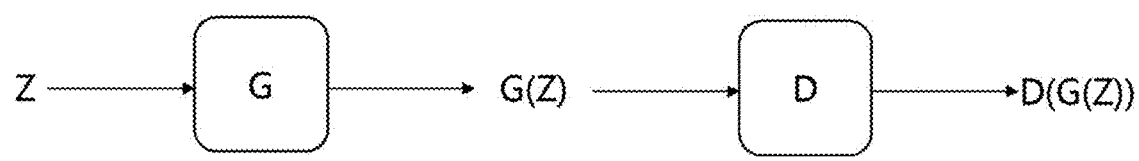
FIG. 4 is a conceptual view of an image transform model according to an embodiment of the present disclosure.

FIG. 4 is a conceptual network architecture diagram of an image transform model according to an embodiment of the present disclosure.

Referring to FIG. 4, the image transform model may be configured with a GAN based structure. The image transform model of FIG. 4 includes a generator G and a discriminator D. The generator is configured to output new data by applying noise to input data. In some embodiments, the generator has an encoder-decoder structure using skip connection.

The generator is aimed at generating data that is so close to real data to deceive the discriminator into taking the close data for the real data. The discriminator is aimed at identifying the real data and the output data of the generator. For example, the generator is aimed at generating an image close to the real X-RAY image of the cargo in the list, and the discriminator is aimed at distinguishing the fake X-RAY image outputted by the generator from the real X-RAY image acquired by directly capturing the real target.

In an embodiment, the image transform model is learned by a training data set including a plurality of training samples. In some embodiments, a training object may be a candidate object (for example, a candidate cargo).

In the above-described embodiment, each training sample may include a non X-RAY image of the training object and a segmented image of the non X-RAY image, and an X-RAY image of the corresponding training object and a segmented image of the X-RAY image. The image transform model may generate, from the non X-RAY image, a fake X-RAY image that is identical or similar to the real X-RAY image that it is hard to distinguish the fake X-RAY image from the real X-RAY image, by learning each of the non X-RAY image and the segmented image of the non X-RAY image, and the real X-RAY image and the segmented image of the real X-RAY image through the training sample set.

In case that the non X-RAY image and the X-RAY image are directly used as the training samples, the image transform model is only learned when the images have a correspondence between them on the pixel level. Additionally, it is very difficult in reality to obtain an accurate pair of the non X-RAY image and the real X-RAY image.

In contrast, as in the above-described embodiment, when the segmented image and the X-RAY image are used as the training samples, the image transform model learned by the training samples calculates segments in the non X-RAY image and generates the X-RAY image in the calculated segments, and thus it is possible to perform image transformation without a direct correspondence between the non X-RAY image and the X-RAY image.

Figure 5:
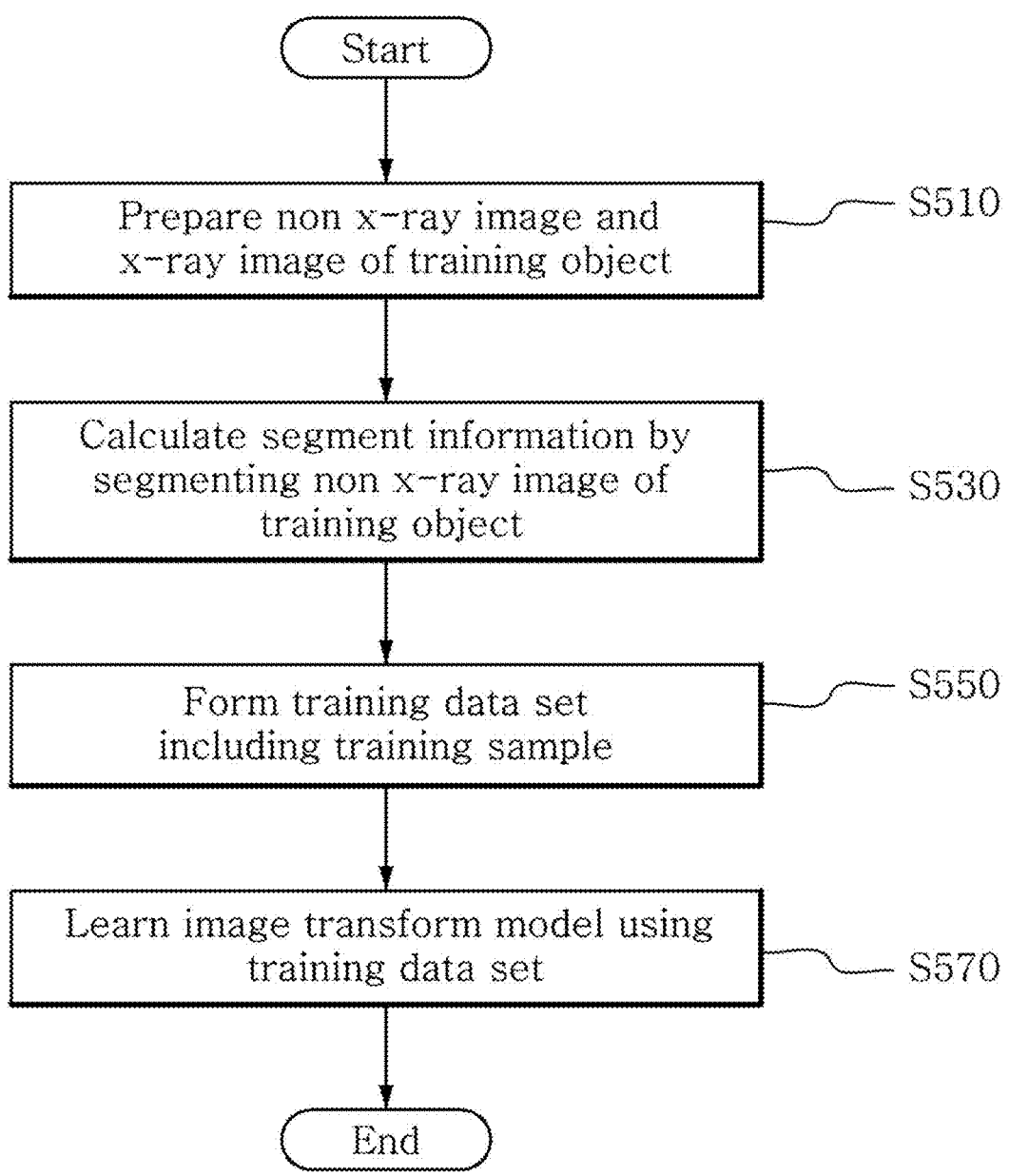
FIG. 5 is a flowchart of a learning process of an image transform model according to an embodiment of the present disclosure.

FIG. 5 is a flowchart of the learning process of an image transform model by acquiring a training data set, according to an embodiment of the present disclosure.

Referring to FIG. 5, a non X-RAY image and an X-RAY image of a training object are prepared (S510). The non X-RAY image of the training object may be directly captured through visible light, or may be prepared through web search. The X-RAY image of the training object may be an image directly captured through X-rays, but is not limited thereto.

The prepared non X-RAY image of the training object is divided into at least one segment (S530). Then, an object included in the non X-RAY image of the training object or part of the object is labeled, and segment information of the non X-RAY image of the training object is calculated. The segment information includes location information and/or boundary information of the segment.

A training data set for image transformation is formed through the steps S510 and S530 (S550). The formed training data set is used in the learning of the image transform model shown in FIG. 4 (S570).

When learning proceeds, the generator and the discriminator update the parameters in the model to achieve each goal (S570). The discriminator learns to reduce the probability of making a mistake, and the generator learns to increase the probability that the discriminator will make a mistake with data outputted from random noise. That is, the generator and the discriminator are learned to solve the minimax problem. Non-Patent Literature 1 (Goodfellow, Ian J.; Pouget-Abadie, Jean; Mirza, Mehdi; Xu, Bing; Warde-Farley, David; Ozair, Sherjil; Courville, Aaron; Bengio, Yoshua (2014). "Generative Adversarial Networks") discloses the learning process for solving the Minimax problem, and a detailed description is omitted herein.

In the learning process (S570), the discriminator receives feedback from a correct answer of an input value (i.e., the training data), and the generator receives the feedback from the discriminator. The sufficiently learned generator is configured to output data close to the input data to the maximum. Here, the close data represents that the probability distributions the two data follow are similar (for example, a difference of the probability distributions of the two data is equal to or lower than a predetermined threshold).

The image transform model may be a model generated by the data processing device 100. Alternatively, the image transform model may be a model generated by an external component of the system 1. In this case, the image transform model may be used to receive and store the image transform model generated by an external computing device disposed remotely from the data processing device 100 before the transformation operation, and generate the X-RAY image. To this end, the data processing device 100 may further include a storage device (not shown) to store the image transform model. The storage device may include at least one of a volatile memory (not shown), a nonvolatile memory (not shown) or an external memory (not shown). For example, the volatile memory may be at least one of Dynamic Random Access Memory (DRAM) such as Random Access Memory (RAM) or Synchronous DRAM (SDRAM), Double Data Rate (DDR) SDRAM or Rambus DRAM (RDRAM), the nonvolatile memory may be any one of Read-Only Memory (ROM) or flash memory, and the external memory may be any one of MultiMediaCard (MMC), Secure Digital (SD) or Compact Flash (CF) memory cards.

In an embodiment, the data processing device 100 may store the pre-learned model in the nonvolatile memory, so that even after the power supply re-starts, the pre-learned model may be used in the nonvolatile memory that does not lose stored data even though reset is performed due to the shut-off of the power supply.

The learned image transform model may transform an input image into an X-RAY image. For example, the image transform model may transform a visible light image of the cargo in the list into an X-ray penetrating or reflected image. In some embodiments, the image transform model may transform an area other than the object corresponding to the reading target into the background. Then, the X-RAY image outputted by the image transform model includes the real background (i.e., the background of the non X-RAY image) and/or the X-RAY image of the object as the background in the X-RAY domain.

In an embodiment, the data processing device 100 may be further configured to post-process the image outputted by the image transform model. For example, a noise pattern of the real X-RAY image may be added to make the output image more similar to the real image.

The X-RAY reading system 1 may support the task of reading the original X-RAY image acquired by directly capturing the reading space in which the reading target is positioned, which has been performed by the user, through the image transformation operation.

The data processing device 100 may detect the reading target in the original X-RAY image by comparing the fake X-RAY image of the reading target, generated by the image transform model, with the original X-RAY image acquired through the X-RAY imaging device 10. The original X-RAY image includes the real X-RAY image of the reading target.

In an embodiment, the data processing device 100 may extract a feature set by extracting features from the image. The data processing device 100 may extract the features from the image through a variety of feature extraction algorithms. For example, the feature extraction algorithm may be Convolution Neural Network (CNN), but is not limited thereto.

The data processing device 100 may extract a first feature set from the original X-RAY image. Additionally, the data processing device 100 may extract a second feature set from the fake X-RAY image.

The data processing device 100 may calculate similarity between the first feature set and the second feature set by applying the first feature set and the second feature set to a variety of similarity comparison algorithms.

For example, the data processing device 100 may calculate similarity between the first feature set and the second feature set through Euclidian distance, Cosine distance, Mahalanobis distance or joint Bayesian.

The data processing device 100 determines if the original X-RAY image and the fake X-RAY image match based on the calculated similarity between the feature sets. In specific embodiments, when the similarity is equal to or higher than a preset threshold, the images are determined to match each other.

When as a result of determination based on the similarity, they are determined to match, the imaged object of the original X-RAY image is read as the object used to generate the fake X-RAY image. Since the object item in the cargo list is used to generate the fake X-RAY image, when they are determined to match based on the similarity, the imaged object in the original X-RAY image may be read as the corresponding object item in the cargo list. The data processing device 100 may perform the reading operation on its own to detect if there is the reading target corresponding to the cargo included in the cargo list among the objects in the original X-RAY image.

Additionally, the data processing device 100 may generate the fake X-RAY image of the item object generated by the image transform model as feedback learning data for re-learning the pre-learned image transform model.

In an embodiment, the feedback learning data may be generated when the reading target is read as the item object.

In an embodiment, the data processing device 100 may generate the feedback learning data by synthesizing the fake X-RAY image of the cargo in the list and the X-RAY image of the background. In some embodiments, the X-RAY image of the background may be the background included in the non X-RAY image of the cargo in the list, or the background included in the transformed X-RAY image of the cargo in the list.

It will be obvious to those skilled in the art that the X-RAY reading system 1 or its component may include other component not described herein. For example, the X-RAY reading system 1 may include other hardware component necessary for the operation described herein, including a network interface, an input device for data entry, memory for storing data, and a display, a printer or an output device for displaying other data.

A method for supporting X-RAY image reading according to another aspect of the present disclosure is performed by a computing device including a processor. The computing device including the processor may be performed by, for example, the X-RAY reading system 1 or its component (for example, the data processing device 100), or a different computing device.

Figure 6:
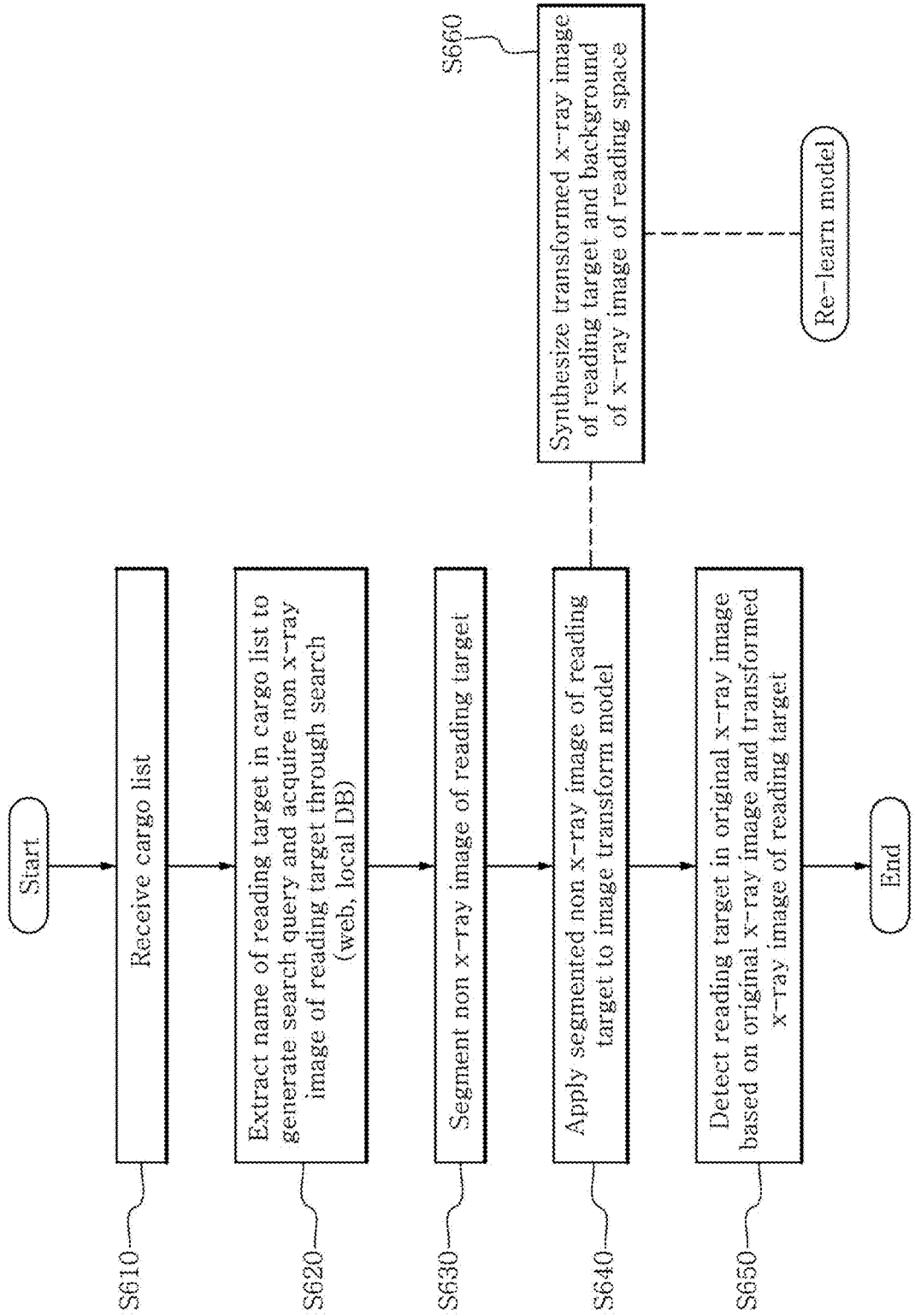
FIG. 6 is a flowchart of an X-RAY reading method according to an embodiment of the present disclosure.

FIG. 6 is a flowchart of an X-RAY reading method according to an embodiment of the present disclosure.

Referring to FIG. 6, a cargo list is received by the computing device (for example, the data processing device 100) (S610). The cargo list includes the name of at least one object.

In the step S610, an item object (for example, cargo in the list) is determined based on the received cargo list. The item object may be the cargo (i.e., the object itself) included in the received cargo list. Alternatively, the category (for example, the type of the object) associated with the object (i.e., the cargo) included in the cargo list may be determined as a reading target. For example, when the cargo list includes 10 different cars, the reading target is determined to be a car as the category associated with the object, namely, the object type.

A non X-RAY image of the item object is acquired by the computing device (for example, the data processing device 100) (S620).

In an embodiment, the computing device extracts the name of the item object (for example, the reading target) from the cargo list, generates a search query based on the extracted name of the item object; transmits the search query to the web server via wired/wireless electrical communication; and receives an image found by the web server in response to the search query as a non X-RAY image of the reading target (S620).

Segment information is calculated by dividing the non X-RAY image into at least one segment by the computing device (for example, the data processing device 100) (S630). In an embodiment, the segment information may be calculated by applying the non X-RAY image of the item object acquired through search to a segmentation model (S630). The segmentation model is built based on, for example, SegNet, but is not limited thereto.

Additionally, in the step S630, a segmented image by segmentation of the non X-RAY image of the item object, inputted to the segmentation model, may be generated.

Figure 7:
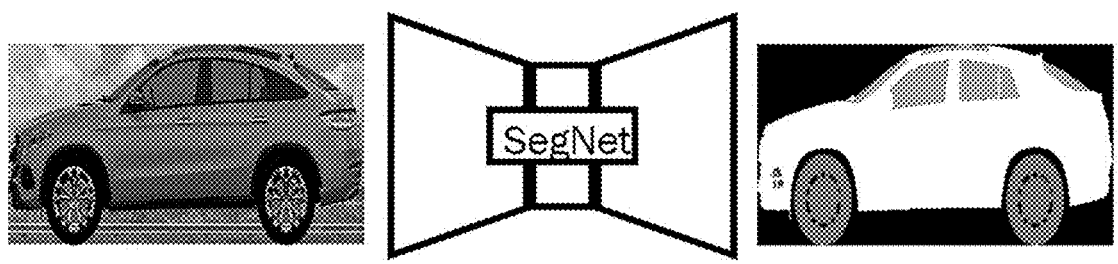
FIG. 7 is a diagram showing a result of segmentation of a non X-RAY image according to an embodiment of the present disclosure.

FIG. 7 is a diagram showing a segmented image acquired by segmentation of a non X-RAY image according to an embodiment of the present disclosure.

Referring to FIG. 7, the segmentation model configured to divide the item object into segments may be used (S630). When a non X-RAY image of a car as the item object is inputted to the segmentation model, as shown in FIG. 7, the body may be partitioned as a first segment, the wheel as a second segment and the window as a third segment, and a segmented image defining each segment may be generated.

The computing device (for example, the data processing device 100) generates a transformed X-RAY image of the item object by applying the non X-RAY image of the item object to the image transform model (S640). A fake X-RAY image of the item object may be generated by further applying segment information of the non X-RAY image of the item object to the image transform model (S640).

In an embodiment, the non X-RAY image of the item object to be applied to the image transform model may be the segmented image by segmentation of the non X-RAY image of the item object found in the step S620.

The image transform model includes a generator configured to receive an image and boundary information and/or location information of an item object that is a target for image transformation, and transform the input image into an X-RAY image. The generator of the image transform model is learned through a training data set including a plurality of training samples, and each training sample includes a non X-RAY image and an X-RAY image of a training object. Additionally, in some embodiments, each training sample may further include segment information of the training object. The structure and learning process of the image transform model have been hereinabove described with reference to FIG. 4, and a detailed description is omitted herein.

In the step S640, a fake X-RAY image of the item object is generated by transformation of the non X-RAY image of the item object. The fake X-RAY image of the step S640 is an X-RAY image, not an image acquired by actually capturing the real item object through radiation.

Figure 8:
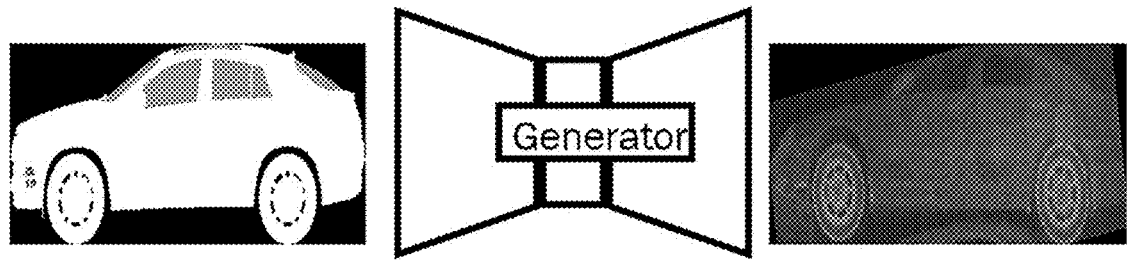
FIG. 8 is a diagram showing a result of transformation of a segmented non X-RAY image into an X-RAY image according to an embodiment of the present disclosure.

FIG. 8 is a diagram showing a result of transformation of a segmented non X-RAY image into an X-RAY image according to an embodiment of the present disclosure.

Referring to FIG. 8, when the segmented image of FIG. 7 and the segment information is inputted to the image transform model, an X-RAY image of the item object, for example, a car is virtually generated (S640).

The fake X-RAY image generated by the image transform model in the step S640 is used for comparison with the real X-RAY image acquired by actually capturing the reading target through X-rays, to support the user's reading task for the original X-RAY image of the reading target.

Additionally, the method may further include detecting the reading target in the original X-RAY image by comparing the fake X-RAY image of the reading target generated in the step S640 with the original X-RAY image acquired by capturing the reading space including the reading target (S650). The original X-RAY image includes the real X-RAY image of the reading target.

When object information of the cargo list matches the real object positioned in the real reading space (for example, inside the container), the fake X-RAY image generated by the image transform model is an image that is identical or similar to the original X-RAY image acquired by directly capturing the reading target. It is because the fake X-RAY image is generated almost similar to the real X-RAY image of the reading target.

As a result of comparison, when the original X-RAY image and the fake X-RAY image match, the imaged object in the original X-RAY image may be read as the corresponding object item in the cargo list.

In an embodiment, the step S650 may include: extracting a first feature set from the original X-RAY image; extracting a second feature set from the fake X-RAY image; calculating similarity between the first feature set and the second feature set; and determining if the original X-RAY image of the reading target and the fake X-RAY image of the item object match based on the calculated similarity score.

As a result of determination, the reading target is identified as the item object. The matching result of the cargo list and the real cargo is provided to support the customs officers reading task to determine if the cargo in the original X-RAY image is the object included in the cargo list.

As such, the original X-RAY image may be automatically read by the computing device. The step S650 may include providing the user with the detection result as the reading result.

In the step S650, the original X-RAY image showing at least part of the reading target is an X-RAY image generated based on the imaging information received from the external X-RAY imaging device, and may be generated by the computing device or may be acquired by receiving a complete image generated by the external computing device.

Additionally, the method may include generating, by the computing device (for example, the data processing device 100), feedback learning data that will be used to re-learn the image transform model of the step S640 pre-learned to generate the fake X-RAY image of the item object. When the item object matches the reading target, the original X-RAY image is used to generate the fake X-RAY image of the item object.

The feedback learning data may be generated by synthesizing the fake X-RAY image of the reading target and the X-RAY image of the background. For example, the feedback learning data may be generated by synthesizing the fake X-RAY image of the reading target, transformed in the step S640, and the X-RAY image of the background.

In some embodiments, the X-RAY image of the background may be the background included in the non X-RAY image of the reading target or the background included in the transformed X-RAY image of the reading target. For example, the background X-RAY image may be the X-RAY image of the background of the step S620 or S640.

In some other embodiments, the background X-RAY image may be the X-RAY image set as the background of the feedback learning data by the user input or selection.

Using the method for supporting X-RAY image reading and the system 1 for performing the same, the reading task is performed by image comparison between the virtual reference image for reading (i.e., the fake X-RAY image of the reading target generated through the image transform model) generated based on text information such as the cargo list and the actually captured original X-RAY image. As a result, it is possible to provide the user (for example, the customs officer) with higher reading convenience than the traditional reading task involving comparing the text (for example, the cargo list) with the image (the original X-RAY image).

Additionally, as the reference image is generated using an image acquired through web search, it can be used in a variety of cargo lists. Accordingly, compared with systems using internal databases having limitations on stored images, it can be used in an infinite range of cargo lists, and has a high utilization possibility.

Further, it is possible to generate the virtual reference image faster than the general image processing through region information (i.e., the segment information) of the SegNet based image and/or GAN based image generation, thereby achieving fast reading, and eventually it has high suitability for use in customs applications.

The operation of the method for supporting X-RAY image reading and the system for performing the same according to the embodiments as described above may be, at least in part, implemented in a computer program and recorded in a computer-readable recording medium. For example, it may be implemented with a program product on the computer-readable medium including program code, and may be executed by the processor for performing any or all of the above-described steps, operations or processes.

The computer may be a computing device such as a desktop computer, a laptop computer, a notebook computer, a smart phone or like, and may be any integrated device. The computer is a device having at least one alternative and specialized processor, memory, storage, and networking component (either wireless or wired). The computer may run an operating system (OS) such as, for example, OS that is compatible with Microsoft Windows, Apple OS X or iOS, Linux distribution, or Google Android OS.

The computer-readable recording medium includes all types of record retrieval devices in which computer-readable data is stored. Examples of the computer-readable recording medium include ROM, RAM, compact disc read only memory (CD-ROM), magnetic tape, floppy disk, and optical data storage and retrieval devices. Additionally, the computer-readable recording medium is distributed over computer systems connected via a network, and may store and execute the computer-readable code in a distributed manner. Additionally, a functional program, code and a code segment for realizing this embodiment will be easily understood by persons having ordinary skill in the technical field to which this embodiment belongs.

While the present disclosure has been hereinabove described with reference to the embodiments shown in the drawings, this is provided by way of illustration and those skilled in the art will understand that various modifications and variations may be made thereto. However, it should be understood that such modifications fall within the scope of technical protection of the present disclosure. Accordingly, the true technical protection scope of the present disclosure should be defined by the technical spirit of the appended claims.

INDUSTRIAL APPLICABILITY

The X-RAY reading system according to an aspect of the present disclosure reads the original X-RAY image after transforming a variety of non X-RAY images acquired via an Internet into X-RAY using the image transform model configured to transform a non X-RAY image into X-RAY by the application of machine learning technology, one of the fourth industrial revolution technology, and thus it has very high availability in the inspection related technical field using the X-RAY reading technology.

The invention claimed is:

1. A method for supporting X-ray image reading using an image transform model, performed by a computing device including a processor, the method comprising:
    receiving information associated with a reading target positioned in a reading space where X-rays pass through or are reflected off, the information associated with the reading target including at least one item object;
    acquiring a non X-RAY image of the item object based on the information associated with the reading target;
    calculating segment information by dividing the non X-RAY image of the item object into at least one segment, the segment information comprising at least one of boundary information and location information of the segment in the non X-RAY image; and
    generating a fake X-RAY image of the item object by applying the non X-RAY image of the item object to the image transform model.

2. The method for supporting X-ray image reading according to claim 1, wherein acquiring the non X-RAY image of the item object comprises:
    extracting a name of the item object from the information associated with the item object;
    generating a search query based on the name of the item object; and
    transmitting the search query to a web server, and receiving an image found in response to the search query received by the web server as the non X-RAY image of the item object.

3. The method for supporting X-ray image reading according to claim 2, wherein the web server is a server that is accessible via World Wide Web and configured to perform a web search.

4. The method for supporting X-ray image reading according to claim 1, wherein dividing the non X-RAY image of the item object into at least one segment occurs before applying the non X-RAY image of the item object to the image transform model, and wherein the segment includes an object or part of the object.

5. The method for supporting X-ray image reading according to claim 4, wherein calculating the segment information comprises:
    applying the non X-RAY image of the item object to a segmentation model, and
    the segmentation model is configured to label a pixel of an input image with a pre-learned class.

6. The method for supporting X-ray image reading according to claim 4, wherein generating the fake X-RAY image of the item object comprises:
    further applying the segment information of the non X-RAY image of the item object to the image transform model.

7. The method for supporting X-ray image reading according to claim 1, wherein the image transform model includes a generator to transform an input image into an X-RAY image, and
    when receiving an input of data, the generator is learned to minimize a data distribution and a reconstruction error of training samples used in learning or generate output data belonging to the data distribution.

8. The method for supporting X-ray image reading according to claim 7, wherein the image transform model is a model that is learned through a training data set including a plurality of training samples, and each training sample includes each of a non X-RAY image and a segmented image, and an X-RAY image and a segmented image of a training object.

9. The method for supporting X-ray image reading according to claim 8, wherein each training sample further includes segment information acquired by dividing the non X-RAY image of the training object, and
    the segment information of each training sample includes at least one of location information and boundary information of the segment included in the non X-RAY image of the training object.

10. The method for supporting X-ray image reading according to claim 1, wherein the non X-RAY image is an image acquired through visible light.

11. The method for supporting X-ray image reading according to claim 1, further comprising:
    reading the reading target of the original X-RAY image by comparing an original X-RAY image of the reading target with the fake X-RAY image of the item object generated by the image transform model.

12. The method for supporting X-ray image reading according to claim 11, wherein the original X-RAY image is generated based on imaging information detected by irradiation of X-rays onto the reading space.

13. The method for supporting X-ray image reading according to claim 11, wherein the comparing comprises:
    extracting a first feature set from the original X-RAY image;
    extracting a second feature set from the fake X-RAY image;
    calculating similarity between the first feature set and the second feature set; and
    determining if the original X-RAY image of the reading target matches the fake X-RAY image of the item object based on the calculated similarity score.

14. The method for supporting X-ray image reading according to claim 1, further comprising:

generating feedback learning data by synthesizing the fake X-RAY image of the item object with an X-RAY image of a background to re-learn the learned image transform model.

15. A non-transitory computer-readable recording medium having a computer program recorded thereon for executing the method for supporting X-ray image reading according to claim 1.

16. A system comprising:
an X-RAY imaging device to emit X-rays to a reading space, in which at least one reading target is positioned, to generate an original X-RAY image of the reading space; and
a data processing device configured to receive imaging information acquired by the X-rays passing through or reflected off the reading space and generate the original X-RAY image of the reading space having captured the reading target; receive information associated with the reading target including an item of at least one object; acquire a non X-RAY image of the item object based on the information associated with the reading target; calculate segment information by dividing the non X-RAY image of the item object into at least one segment, the segment information comprising at least one of boundary information and location information of the segment in the non X-RAY image; and generate a fake X-RAY image of the item object by applying the non X-RAY image of the item object to an image transform model.

17. The system according to claim 16, wherein the data processing device is accessible to a web server via a network, and
the system is further configured to generate a search query based on the information associated with the reading target, transmit the search query to the web server, and receive an image found in response to the search query received by the web server as the non X-RAY image of the item object.

18. The system according to claim 16, wherein the image transform model includes a generator to transform an input image into an X-RAY image, and
when receiving an input of data, the generator is learned to minimize a data distribution and a reconstruction error of training samples used in learning or generate output data belonging to the data distribution.

19. The system according to claim 16, wherein the data processing device is further configured to calculate the segment information before applying the non X-RAY image of the item object to the image transform model, and
the segment includes an object or part of the object.

20. The system according to claim 16, wherein the data processing device is further configured to detect the reading target in the original X-RAY image by comparing the original X-RAY image with the fake X-RAY image of the item object generated by the image transform model.

* * * * *